INVENTOR.
J. N. SCOTT

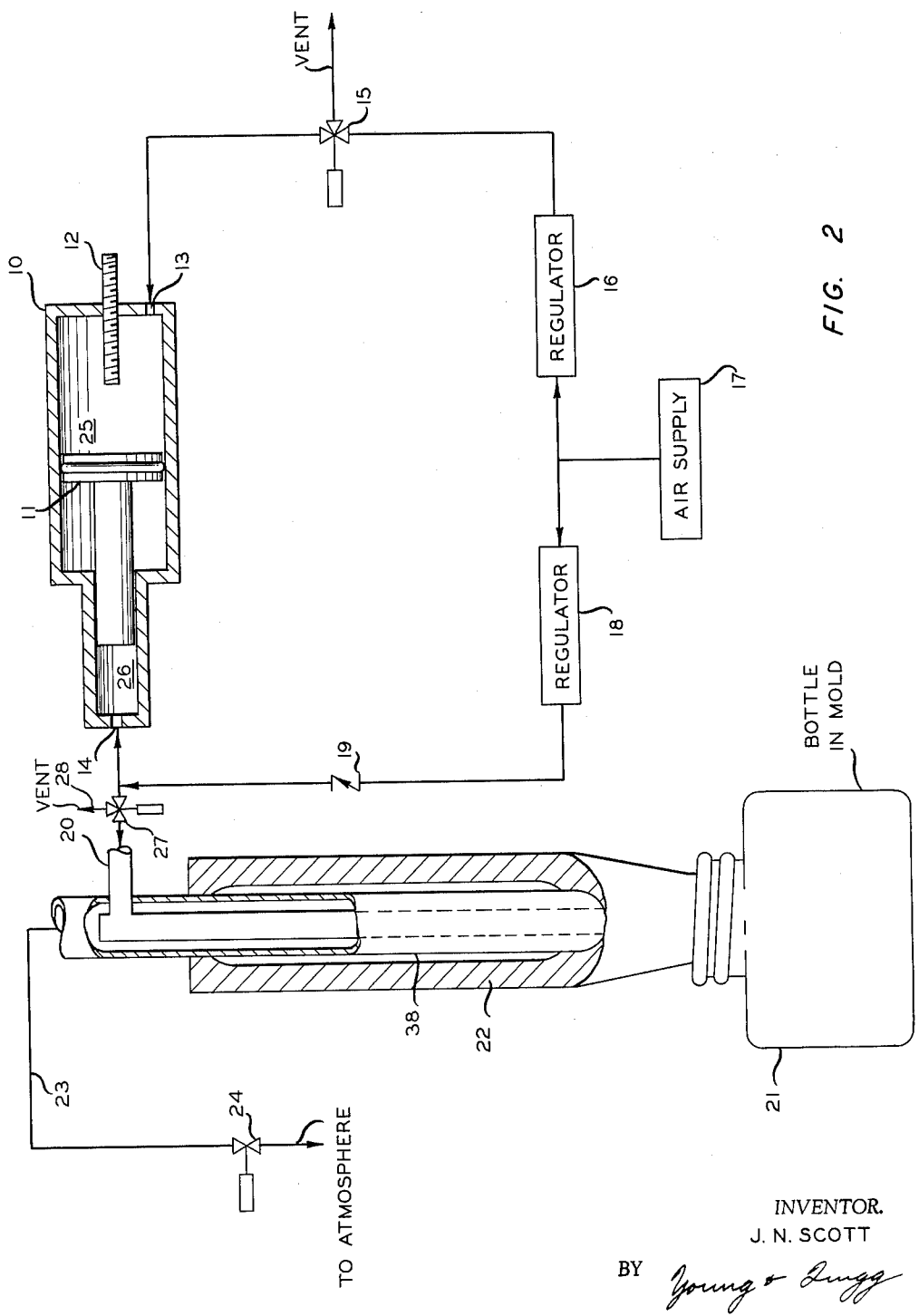

United States Patent Office 3,257,485
Patented June 21, 1966

3,257,485
METHOD OF AND APPARATUS FOR SUPPLYING
A HIGH PRESSURE
John N. Scott, Jr., Bartlesville, Okla., assignor to Phillips
Petroleum Company, a corporation of Delaware
Filed Feb. 26, 1962, Ser. No. 175,773
7 Claims. (Cl. 264—98)

This invention relates to a method of and apparatus for supplying a high gaseous pressure. In a specific aspect, this invention relates to a method of and apparatus for blow molding a plastic material. In another specific aspect, this invention relates to a method of and apparatus for supplying a high initial forming gaseous pressure to a system for blow molding a plastic material without transmitting excessive pressure to the mold.

The process of blow forming articles, such as bottles, from thermoplastic material comprises first bringing a thermoplastic material to a plastic and moldable condition. Some examples of thermoplastic materials, hard at normal pressures and rendered plastic and moldable under elevated temperatures and pressures, that can be employed in the production of blown hollow thermoplastic articles are prepared from polymers and copolymers of polystyrene, polyvinyl chlorides, 1-olefins such as ethylene, propylene, 1-butene, 1-pentene, 4-methyl-1-pentene, 3-methyl-1-butene, 3,3-dimethyl-1-butene, and the like, polymerized by any suitable procedure. The thermoplastic material in a comminuted form is subjected simultaneously to heat and pressure. The apparatus employed comprises any plasticating means, such as an extruder and injection molding machine having a parison extrusion die directly communicating therewith.

A commercial process comprises rendering a thermoplastic material molten by an injection molding machine. Such plastication is obtained by feeding a portion of the thermoplastic material by a ram through a heated cylinder having a torpedo centered therein. The molten material is fed from the injection nozzle to the parison extrusion die and the parison (tubular form) is extruded from said die by the force exerted by said ram. When an extruder is used as the plasticating means, a force supplied by the extruder is utilized to extrude the parison from the die. When employing an extruder, the continuous operation of same is maintained by use of at least two parison dies being fed alternately from the extruder. Another method utilizes an extruder feeding molten plastic material to a reservoir chamber, wherein a piston intermittently forces material therefrom to a parison extrusion die.

The parison is extruded downward to the die, the mold closes around the parison, sealing together the lower ends of the parison by clamping same together. The parison is expanded by positive pressure to the shape of the mold. The pressure applied to the mold exterior, maintaining the mold in a closed or clamped position, is referred to as the clamping pressure. After the article has taken shape and the mold is opened, the article is severed from the parent thermoplastic material at the die.

In carrying out the above process, the thermoplastic material is introduced for molding to the cool mold and blown therein to shape the article, and thereafter the article is removed from the mold. It has been observed that a high initial gaseous pressure is desirable for blow molding thermoplastic materials. To some extent, a moderately high pressure can be achieved with conventional air compressors. However, pressures in excess of 125 to 150 p.s.i. are difficult to achieve. An undesirable feature of the employment of pressures of this magnitude for blow molding is that the clamp pressure is frequently exceeded, causing the mold to open and the part to be spoiled.

I have discovered a method of and apparatus for supplying a high gaseous pressure. I have further discovered an improved method of and apparatus for the blow molding of thermoplastic materials wherein a high gaseous pressure is supplied initially for the blowing of the thermoplastic material with a low gaseous pressure developed in the mold at the completion of the blowing cycle.

Accordingly, an object of my invention is to provide an improved method of and apparatus for supplying a high gaseous pressure.

Another object of my invention is to provide an improved method of and apparatus for applying a high gaseous pressure to a specific volume.

Another object of my invention is to provide an improved method of and apparatus for blow molding plastic materials.

Another object of my invention is to provide an improved method of and apparatus for supplying a high initial gaseous pressure at a high rate in the blow molding of plastic materials.

Other objects, advantages and features of my invention will be readily apparent to those skilled in the art from the following description and the appended claims.

Although the invention will hereinafter be described as applying to the blow molding of plastic materials, it is not intended to limit the invention thereto. The inventive method and apparatus set forth is applicable to other systems wherein it is desired to apply a high gaseous pressure to a specific volume utilizing a low pressure source. The inventive method and apparatus therefor is particularly applicable to the supplying of a high initial gaseous pressure to a process system utilizing a low pressure source and wherein said high pressure is to be applied to a specific volume, the pressure of the process system returning to a normal operating pressure after application of the high gaseous pressure is complete.

FIGURE 2 is a schematic drawing representative of the inventive method and apparatus therefor as applied to the blow molding of a plastic material.

Figure 1:
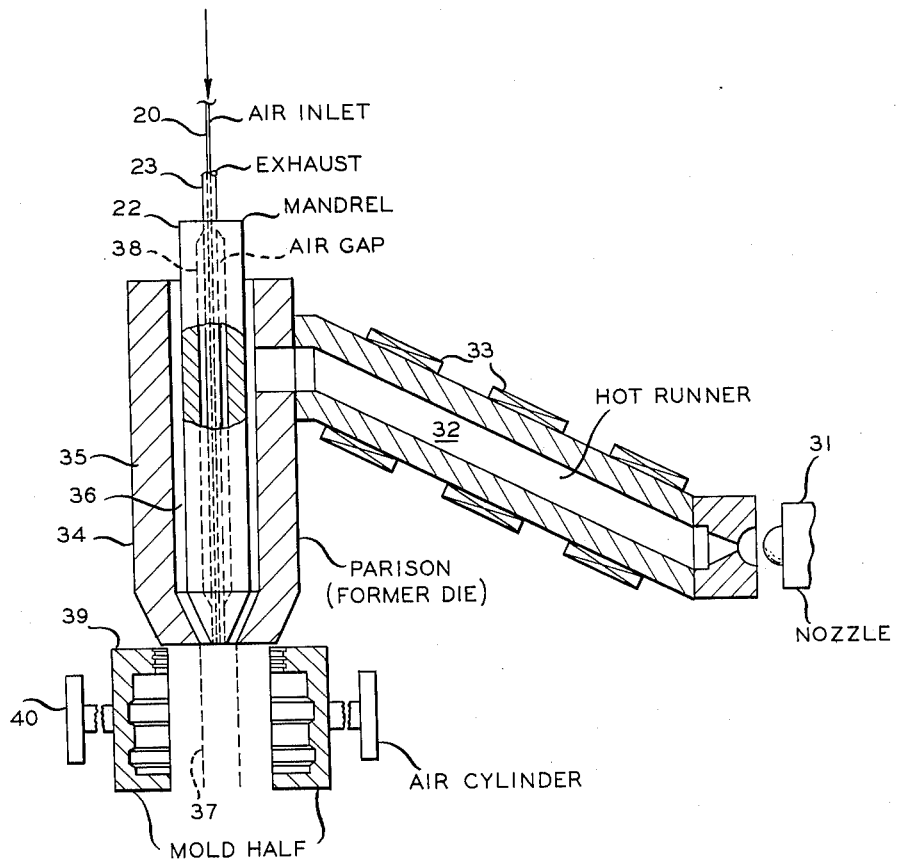
FIGURE 1 is a sectional view of a blow molding system.

Referring now to FIGURE 1, molten plastic material is fed from a plasticating means, such as an extruder or injection molding machine, not shown, to a nozzle 31 which communicates with hot runner 32 encircled by heater bands 33. Molten plastic material is fed from the hot runner 32 to parison die 34. The parison die 34 comprises cylindrical housing member 35, having mandrel 22 disposed therein to form annular area 36. Conduit 23 is positioned vertically through mandrel 22. Conduit 20 is concentrically positioned in conduit 23. Mandrel 22 is recessed around conduit 23 to form air gap 38. Mold halves 39 operated by air cylinders 40 close around parison 37 extruded from annular area 36.

In FIGURE 2 there is illustrated a high gaseous pressure cylinder 10 having a reciprocating piston 11. The movement of piston 11 within high pressure cylinder 10 is restricted by a piston stop means 12, herein illustrated as an adjustable piston stop means threadably engaging the high pressure cylinder 10.

Pressurized air is passed from air supply source 17 through a regulating means 18 and a check valve means 19 to high pressure cylinder 10, passing through inlet means 14 into compression chamber 26. On the movement of pressurized air into chamber 26, piston 11 is moved until it is brought to bear against piston stop means 12.

Pressurized air is also transmitted from air supply source 17 through a regulating means 16 and control valve means 15 to high pressure cylinder 10, passing into power chamber 25 via inlet means 13. Control valve means 15 can be, for example, a solenoid activated valve.

Control valve means 15 can be operated by a timer, not herein illustrated. A conventional timer provides output signals in a desired sequence. One common type of timer which can be employed utilizes a series of cam operated switches wherein associated cams are rotated by a timing motor. As illustrated, control valve means 15 is provided with a vent means, thereby providing a means of venting the air from chamber 25 as piston 11 moves against piston stop means 12. Although two regulating means (16 and 18) are herein illustrated, it is within the scope of this invention to utilize only one regulating means, passing pressurized air from the single regulating means to check valve means 19 or control valve means 15.

The pressurized air entering chamber 25 exerts a pressure upon piston 11, causing piston 11 to move rapidly away from adjustable stop means 12 and rapidly increasing the gaseous pressure in conduit means 20 above that set by regulating means 18 until the volume of air present in chamber 26 has been completely removed from chamber 26. The pressure of the air passed to chamber 25 is dependent upon the relative diameters of chambers 25 and 26, the gaseous pressure within chamber 26 and upon the maximum desired gaseous pressure in conduit 20.

In operation, reciprocating piston member 11 is positioned adjacent to piston stop means 12 at the beginning of the blowing cycle, with the volume of compression chamber 26 normally equal to or less than the volume of the blown hollow article. As noted, in the discussion of FIGURE 1, molten plastic material is passed from nozzle 31, through hot runner 32, to parison die 34. Mold halves 39 operated by air cylinders 40 close around parison 37 extruded from annular area 38. Low pressure air is then passed from air supply 17 through regulator 16 and control valve 15 to inlet means 13 and power chamber 25. Piston 11 is moved rapidly exerting a high pressure upon the volume of air in compression chamber 26. High pressure is transmitted from compression chamber 26 to conduit 20. The high pressure air is transmitted through control valve 27. Control valve 27 can be operated by a timer as in the case of valve 15.

The high pressure air entering conduit means 20 expands the plastic material into the shape provided by the mold. Upon the passage of all of the high pressure air from chamber 26, the pressure within conduit 20 and the blown hollow article is reduced to the pressure transmitted by regulator 18. After compression chamber 26 has been completely evacuated and the blown plastic article formed, control 15 discontinues the passage of pressurized air to chamber 25. Low pressure air is transmitted through regulator 18 to conduit 20, repositioning piston 11 adjacent to stop means 12 and cooling the hollow blown plastic article contained within the mold by passing the low pressure air through valve 27. Air is vented via conduit means 23 and control valve means 24 from the bottle in the mold during the cooling step. As in the case of control valve means 15, control valve means 24 can be a solenoid activated valve operated by a timing means not herein illustrated. Operation of control valve means 24 is such that said valve means is in the closed position during the period of time that the high pressure air is being transmitted from chamber 26 to the bottle in the mold and control valve means 24 is maintained in the open position when it is desired to vent the air passing from air supply 17 through the bottle in the mold. Control valve means 24 can be a relief valve means, set to exhaust at the maximum allowable pressure in the mold. Control valve means 24 can, therefore, serve either as a high pressure blowing step relief valve means during the blowing cycle or as a relief valve means during the cooling step of the blow molding process.

Upon completion of the cooling step, valve 27 is closed to the flow of air from air supply 17 and the air from the blown article is vented via conduit means 28, thereby facilitating the easy removal of the blown article from the mold.

I have provided a method of and apparatus for supplying a high initial forming gaseous pressure to a hollow plastic article blowing system without admitting excessive pressure to the mold.

Although in the description of the invention pressurized air has been employed, it is not intended to limit the invention thereto. Other compressible gaseous fluids, inert to the plastic material utilized, can be employed.

As will be evident to those skilled in the art, various modifications of this invention can be made, or followed, in the light of the foregoing disclosure and discussion without departing from the spirit or the scope thereof.

I claim:

1. A process of blowing a hollow article from a plastic material expansible by blowing which comprises feeding a fixed volume of gas under a first pressure to a compression zone containing a first reciprocating piston, thereafter feeding a gas under a second pressure to a power zone containing a second reciprocating piston in fixed relationship with said first reciprocating piston, thereafter passing from said compression zone said fixed volume of gas under a third pressure higher than said first pressure to an extruded portion of said plastic material, blowing the extruded portion of said plastic material into conformity with the confines of an enclosing mold with said fixed volume at said third pressure, said fixed volume of gas no greater than the volume of said hollow article, and thereafter feeding said gas under first pressure to the interior of said blown hollow article.

2. The process of claim 1 to include passing from said blown hollow article said gas under said first pressure.

3. A process of blowing a hollow article from a plastic material expansible by blowing which comprises feeding a gas under a first pressure to a compression zone containing a first reciprocating piston, positioning said first reciprocating piston so that the volume of gas contained within said compression zone is equal to the volume of said blown hollow article, thereafter feeding a gas under said first pressure to a power zone, said power zone positioned immediately adjacent to and in communication with said compression zone and containing a second reciprocating piston in fixed relationship with said first reciprocating piston, thereafter passing from said compression zone said volume of gas at a second pressure higher than said first pressure to an extruded portion of said plastic material, blowing said extruded portion of said plastic material into conformity with the confines of an enclosing mold with said volume of gas at said second pressure, thereafter passing a gas under said first pressure to the interior of said blown hollow article, and passing from said blown hollow article said gas under said first pressure.

4. Apparatus for forming a blown hollow article from a plastic material which is expansible by blowing, which comprises a compression chamber, first reciprocating piston positioned within said compression chamber, means for extruding said plastic material, means for feeding a first gas under pressure to said compression chamber, a power chamber, a second reciprocating piston positioned within said power chamber and in fixed relationship with said first reciprocating piston, means for feeding a second gas under pressure to said power chamber, and means for passing from said compression chamber a volume of said first gas at a gaseous pressure higher than the pressure of said first gas passed to said compression chamber to the extruded plastic material equal to the volume of said blown hollow article.

5. Apparatus for forming a blown hollow article from a plastic material which is expansible by blowing, which comprises a compression chamber, a first reciprocating piston positioned within said compression chamber, means for feeding a first gas under pressure to said compression chamber, means for positioning said first reciprocating piston so that the volume of said first gas received within said compression chamber is equal to the volume of said blown hollow article, means for extruding said plastic material, a power chamber, said power chamber positioned immediately adjacent to and in communication with said compression chamber, a second reciprocating piston positioned within said power chamber and in fixed relationship with said first reciprocating piston, means for feeding a second gas under pressure to said power chamber, and means for passing from said compression chamber to said extruded plastic material said volume of said first gas at a pressure higher than the pressure of said first gas introduced into said compression chamber.

6. The apparatus of claim 5 to include means for passing to said blown hollow article a gas under a pressure lower than the pressure of said volume of said first gas passed to said blown hollow article.

7. The apparatus of claim 6 to include means for passing from said blown hollow article said gas passed to said blown hollow article under a pressure lower than the pressure of said volume of said first gas passed to said blown hollow article.

References Cited by the Examiner

UNITED STATES PATENTS

| | | | |
|---|---|---|---|
| 2,175,054 | 10/1939 | Ferngren et al. | 18—5 |
| 2,348,738 | 5/1944 | Hofmann | 264—94 |
| 2,539,292 | 1/1951 | Anderson | 230—52 |
| 2,909,315 | 10/1959 | Sampietro | 230—52 |
| 2,928,120 | 3/1960 | Leghorn et al. | 18—5 |
| 2,930,079 | 3/1960 | Parfrey | 18—5 |

ROBERT F. WHITE, *Primary Examiner.*

MICHAEL V. BRINDISI, *Examiner.*

L. D. RUTLEDGE, M. H. ROSEN, J. A. FINLAYSON,
*Assistant Examiners.*